(12) United States Patent
Kim et al.

(10) Patent No.: US 9,067,343 B2
(45) Date of Patent: Jun. 30, 2015

(54) AGING APPARATUS AND METHOD

(75) Inventors: Gyeong Su Kim, Seoul (KR); Kwang Hee Park, Suwon-si (KR); Kyung Mo Kang, Gumi-si (KR); Sung Gun Baek, Gumi-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 373 days.

(21) Appl. No.: 13/355,126

(22) Filed: Jan. 20, 2012

(65) Prior Publication Data

US 2013/0075951 A1     Mar. 28, 2013

(30) Foreign Application Priority Data

Sep. 27, 2011    (KR) ........................ 10-2011-0097361

(51) Int. Cl.
*B29C 35/16* (2006.01)
*B29C 45/00* (2006.01)
*B29C 45/72* (2006.01)
*B29C 45/17* (2006.01)

(52) U.S. Cl.
CPC ......... *B29C 35/16* (2013.01); *B29C 2035/1616* (2013.01); *B29C 45/1769* (2013.01); *B29C 45/7207* (2013.01)

(58) Field of Classification Search
None
See application file for complete search history.

(56) References Cited

U.S. PATENT DOCUMENTS

| | | | | |
|---|---|---|---|---|
| 3,852,011 A | * | 12/1974 | Maiocco | 425/547 |
| 4,097,573 A | * | 6/1978 | Parmann | 264/322 |
| 4,364,466 A | * | 12/1982 | Mojden | 198/461.2 |
| 2004/0096602 A1 | * | 5/2004 | Rice et al. | 428/34.1 |
| 2004/0258786 A1 | * | 12/2004 | Senda et al. | 425/143 |
| 2010/0294624 A1 | * | 11/2010 | Warner | 198/502.2 |

FOREIGN PATENT DOCUMENTS

| | | | |
|---|---|---|---|
| DE | 102008014958 A1 | * | 9/2009 |
| JP | 61143525 A | * | 7/1986 |

* cited by examiner

*Primary Examiner* — Ryan Ochylski
(74) *Attorney, Agent, or Firm* — Staas & Halsey LLP (57) ABSTRACT

An aging apparatus and method capable of shortening time for removing molded products from an injection molding device and cooling the same, thereby enhancing production efficiency. The aging apparatus includes an injection molding device configured to produce molded products and allow the molded products to be removed and fall therefrom, a guide pipe to guide the molded products falling from the injection molding device therethrough in such a manner that bottoms of the molded products are directed downwards, a tub mounted below the guide pipe, the tub containing water to cool the molded products falling into the tub through the guide pipe and absorb shock applied to the molded products, and a conveying device to convey the molded products cooled by the water in the tub to the outside.

9 Claims, 5 Drawing Sheets

AGING APPARATUS AND METHOD

CROSS-REFERENCE TO RELATED APPLICATIONS

This application claims the benefit of Korean Patent Application No. 2011-0097361, filed on Sep. 27, 2011 in the Korean Intellectual Property Office, the disclosure of which is incorporated herein by reference.

BACKGROUND

1. Field

Embodiments of the present disclosure relate to an aging apparatus and method to cool products molded using an injection molding device.

2. Description of the Related Art

Generally, products molded using an injection molding device need to be cooled. In order to perform a cooling process, products molded using an injection molding device are first removed by a robot and conveyed by a conveyor. The products conveyed by the conveyor are transported to a warehouse. While stored in the warehouse, the products are naturally cooled.

Such a cooling process needs a robot to remove products from an injection molding device, which increases costs because of usage of the robot and time for removing the products from the injection molding device.

Also, because the products conveyed by a conveyor are stored in a location such as a warehouse to be naturally cooled, a place to store the products is required.

Also, because the natural cooling method requires a long time for the products to naturally cool, products molded using an injection molding device cannot be used immediately.

SUMMARY

It is an aspect of the present disclosure to provide an aging apparatus and method capable of rapidly cooling products molded using an injection molding device by introducing the products into water in a tub immediately after molding.

It is another aspect of the present disclosure to provide an aging apparatus and method capable of shortening time for removing products from an injection molding device by allowing the products to fall from the injection molding device into a tub without using a robot to remove the products.

Additional aspects of the disclosure will be set forth in part in the description which follows and, in part, will be obvious from the description, or may be learned by practice of the disclosure.

In accordance with one aspect of the present disclosure, an aging apparatus includes an injection molding device configured to produce molded products and allow the molded products to be removed and fall therefrom, a guide pipe to guide the molded products falling from the injection molding device therethrough in such a manner that bottoms of the molded products are directed downwards, a tub mounted below the guide pipe, the tub containing water to cool the molded products falling into the tub through the guide pipe and absorb shock applied to the molded products, and a conveying device to convey the molded products cooled by the water in the tub to the outside.

The molded products may fall from the injection molding device when being removed from the injection molding device.

The guide pipe may include a body part having a shape corresponding to a shape of the molded products so as to easily guide the molded products falling from the injection molding device, and a guide part extending upwards from the body part and formed in a funnel shape having a diameter which increases in the upward direction.

The amount of water in the tub may be set such that lower portions of the molded products are immersed in the water so as to facilitate conveyance of the molded products in the tub as well as to forcibly cool the lower, portions of the molded products.

The tub may be mounted with a water injection device thereinside, which injects water to the molded products in the tub to smoothly convey the molded products.

The tub may be mounted with a temperature sensor and a water level sensor thereinside. The temperature sensor is configured to measure a temperature of the water in the tub, and the water level sensor is configured to measure a level of the water in the tub.

The conveying device may include a first conveyor mounted in the tub, a second conveyor slantedly mounted next to the first conveyor, and a third conveyor mounted next to the second conveyor to convey the molded products to the outside.

The molded products falling onto the first conveyor in the tub may be conveyed from the first conveyor to the second conveyor by the water injection device.

The second conveyor may be formed with convex portions on a slope so as to prevent the molded products from slipping while being conveyed by the second conveyor.

The third conveyor may be mounted with air spraying devices so as to facilitate drying and cooling of the molded products on the third conveyor.

The air spraying devices may be mounted above and below the third conveyor and on left and right sides of the third conveyor so as to spray air to top, bottom, left and right portions of the molded products on the third conveyor.

In accordance with another aspect of the present disclosure, an aging method includes removing molded products from an injection molding device so that the molded products free-fall, guiding the molded products falling from the injection molding device via a guide pipe to introduce the molded products into a tub mounted below the guide pipe in such a manner that bottoms of the molded products are directed downwards, cooling the molded products introduced into the tub through the guide pipe using water contained in the tub, and conveying the molded products cooled by the water in the tub to the outside via a conveying device.

The molded products may fall from the injection molding device when being removed from the injection molding device.

The amount of water in the tub may be set such that lower portions of the molded products are immersed in the water so as to facilitate conveyance of the molded products in the tub as well as to forcibly cool the lower portions of the molded products.

The water in the tub may absorb shock applied to the molded products falling into the tub.

The aging method may further include controlling a temperature and level of the water using a temperature sensor and a water level sensor mounted in the tub so as to enhance efficiency of cooling the molded products using the water in the tub.

The aging method may further include injecting water to the molded products in the tub using a water injection device mounted in the tub so as to smoothly convey the molded products.

The conveying the molded products may include conveying the molded products falling onto a first conveyor mounted in the tub to a second conveyor slantedly mounted next to the first conveyor by injecting water to the molded products through the water injection device, conveying the molded products out of the water using the second conveyor, and conveying the molded products to the outside using a third conveyor mounted next to the second conveyor.

The second conveyor may be formed with convex portions on a slope so as to prevent the molded products from slipping while being conveyed by the second conveyor.

The aging method may further include spraying air to the molded products while the molded products are conveyed by the third conveyor using air spraying devices mounted to the third conveyor so as to facilitate drying and cooling of the molded products.

The air spraying devices may repeatedly spray air to top, bottom, left and right portions of the molded products on the third conveyor.

As described above, the aging apparatus and method according to the embodiments of the present disclosure are capable of shortening time for removing molded products from an injection molding device and cooling the molded products, thereby enhancing production efficiency.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
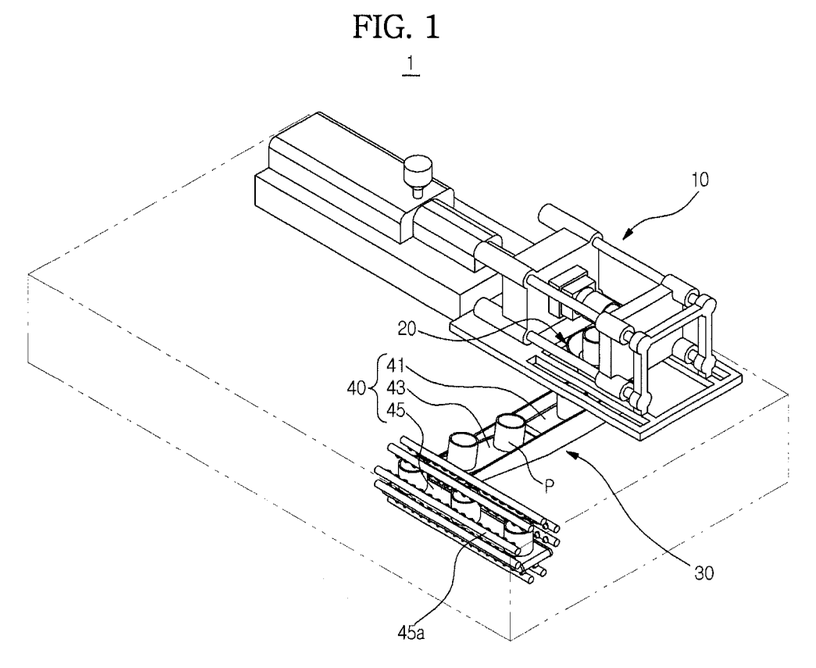
FIG. 1 is a perspective view showing an aging apparatus according to an embodiment of the present disclosure.
Figure 2:
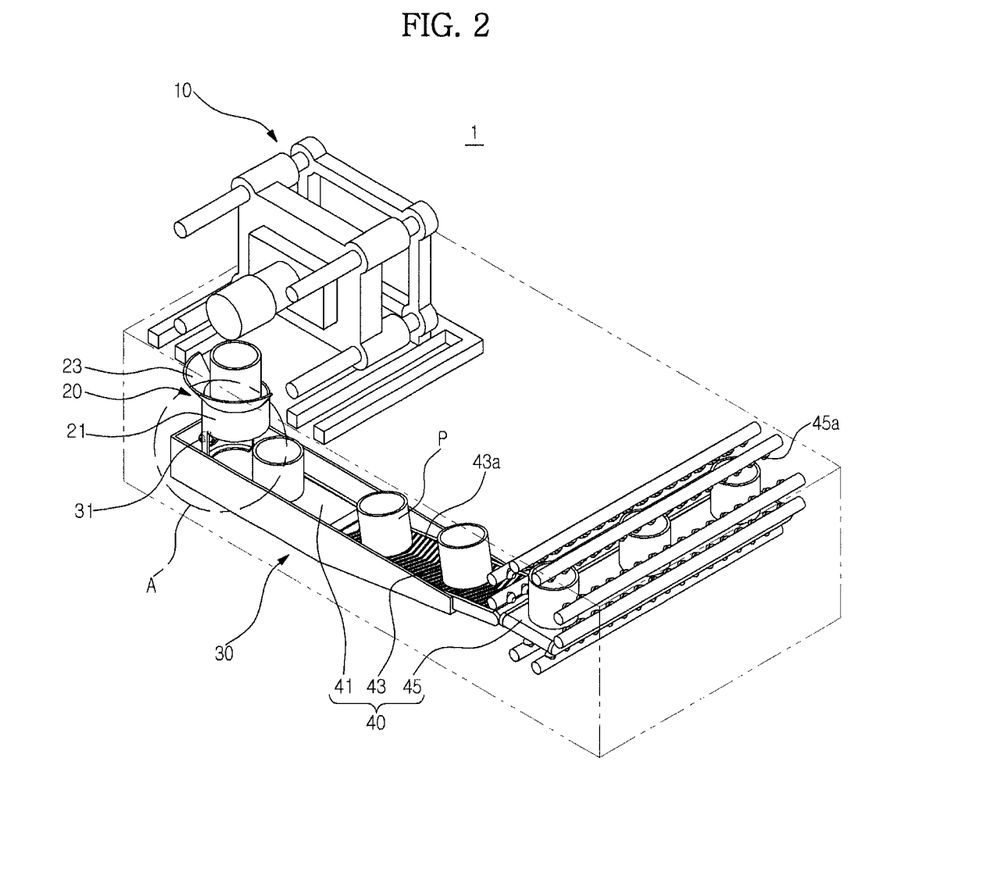
FIG. 2 is a perspective view showing the aging apparatus according to the embodiment of the present disclosure when viewed from another side.
Figure 3:
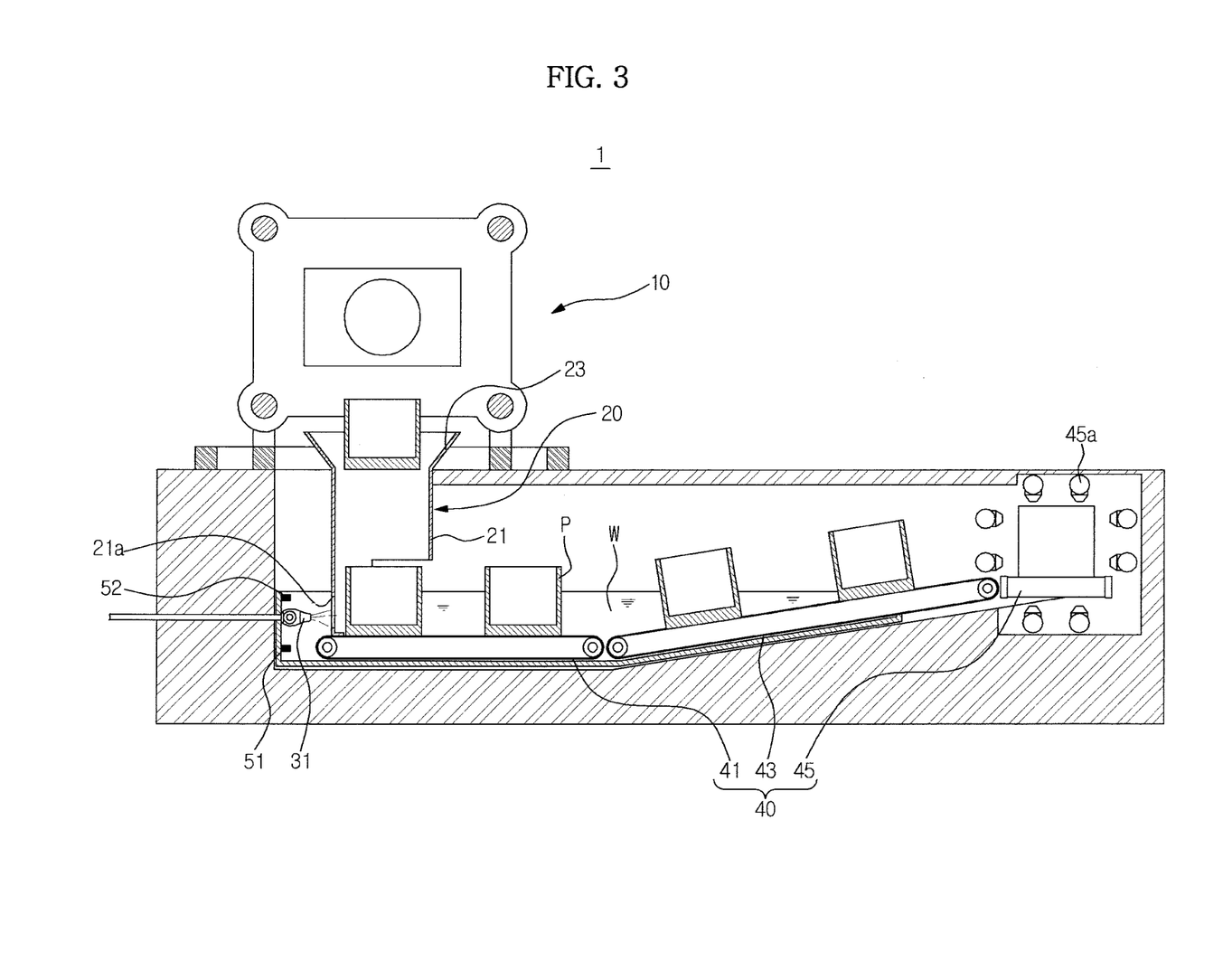
FIG. 3 is a sectional view showing the aging apparatus according to the embodiment of the present disclosure.

As shown in FIG. 1 through FIG. 3, an aging apparatus 1 according to an embodiment of the present disclosure includes an injection molding device 10 to produce molded products P, a guide pipe 20 to guide the products P removed and falling from the injection molding device 10 in such a manner that bottoms of the products P are directed downwards, a tub 30 mounted below the guide pipe 20, the tub 30 containing water W to cool the products P falling through the guide pipe 20, and a conveying device 40 to convey the products P cooled by the water W in the tub 30 to the outside.

The injection molding device 10 is configured to produce the molded products P using a mold. The products P molded using the injection molding device 10 may have hot spots, which need to be cooled. In order to cool the hot spots, the molded products P are removed from the injection molding device 10.

Immediately after being removed from the injection molding device 10, the products P fall out of the injection molding device 10. The products P fall into the tub 30 containing the water W through the guide pipe 20.

The guide pipe 20 includes a body part 21 having a shape corresponding to a shape of the products P molded using the injection molding device 10, and a guide part 23 extending upwards from the body part 21. The guide part 23 is formed in a funnel shape, a diameter of which increases in the upward direction. The guide pipe 20 guides the products P removed and falling from the injection molding device 10 in such a manner that bottoms of the products P are directed downwards when the products P are introduced into the tub 30 containing the water W.

Since the guide part 23 of the guide pipe 20 has a funnel shape, the products P falling from the injection molding device 10 may easily enter the guide pipe 20. The body part 21 of the guide pipe 20 has a shape corresponding to a shape of the products P and has a diameter slightly larger than a size of the products P. Accordingly, when the products P passing through the guide pipe 20 are introduced into the tub 30, the products P are prevented from being turned over and bottoms of the products P are directed downwards. The body part 21 of the guide pipe 20 may be formed with an injection hole 21a, through which a water injection device 31 (which will be described later) mounted to the tub 30 injects water to the products P.

The tub 30 is mounted below the guide pipe 20, and contains the water W to cool the products P falling through the guide pipe 20 from the injection molding device 10. Since the products P introduced into the tub 30 are forcibly cooled by the water W in the tub 30, the cooling process is rapidly completed. Also, since the water W absorbs shock applied to the products P falling into the tub 30, the products P are prevented from being damaged.

The tub 30 contains such an amount of water that only lower portions of the products P are immersed in the water W so as to facilitate conveyance of the products P as well as to cool the lower portions or hot spots of the products P molded using the injection molding device 10.

Inside the tub 30 are mounted a temperature sensor 51 to measure a temperature of the water W and a water level sensor 52 to measure a level of the water W. By controlling a temperature and a level of the water W using the temperature sensor 51 and the water level sensor 52, cooling efficiency of the products P may be improved.

However, the products P falling into the tub 30 may not be smoothly conveyed because of flow resistance of the water W contained in the tub 30. In order to solve such a phenomenon, the tub 30 is mounted with a water injection device 31 thereinside, to inject water to the products P in the tub 30, thereby smoothly conveying the products P.

Figure 4:
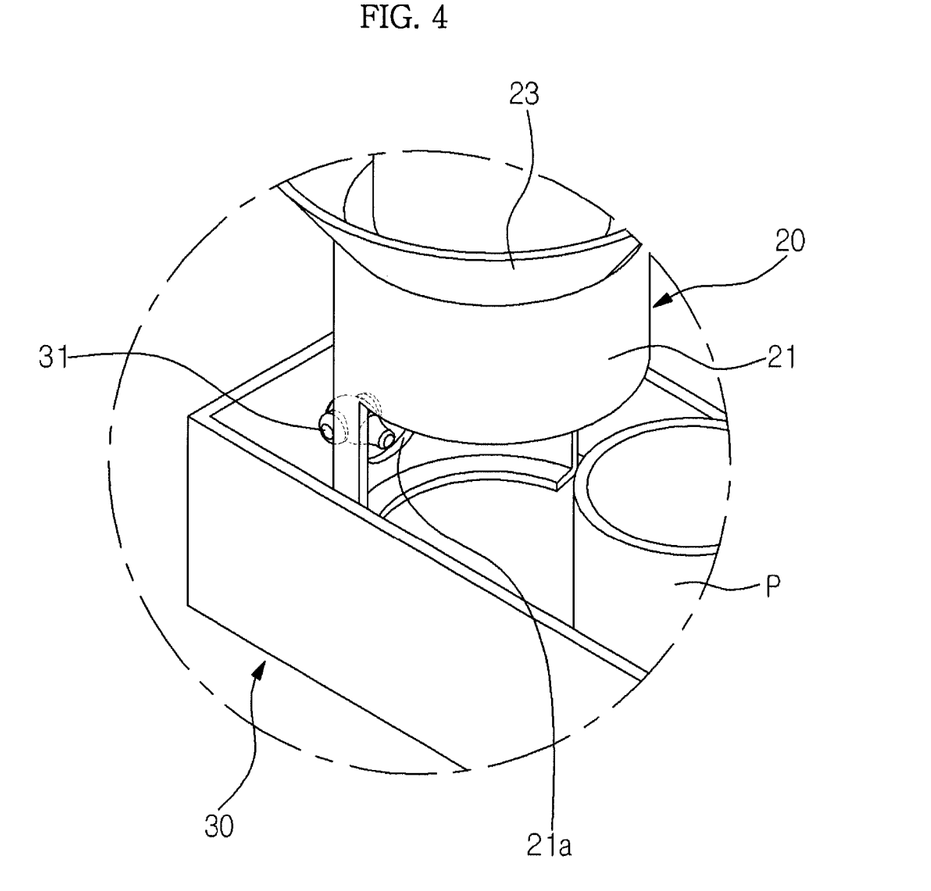
FIG. 4 is an enlarged view of a portion A in FIG. 2.

As shown in FIG. 2 through FIG. 4, the water injection device 31 injects water directly to the products P in the tub 30 through the injection hole 21a formed at the body part 21 of the guide pipe 20. Accordingly, the products P in the tub 30 may be smoothly conveyed on the water W.

After the products P falling into the tub 30 are cooled by the water W, the products P are conveyed to the outside by the conveying device 40. The conveying device 40 includes a first conveyor 41 mounted in the tub 30, a second conveyor 43 slantedly mounted next to the first conveyor 41, and a third conveyor 45 mounted next to the second conveyor 43 to convey the products P to the outside.

Since the first conveyor 41 is immersed in the water W in the tub 30, the products P on the first conveyor 41 may not be smoothly conveyed because of flow resistance of the water W. By injecting water to the products P on the first conveyor 41 through the water injection device 31 mounted in the tub 30, the products P may be smoothly conveyed from the first conveyor 41 to the second conveyor 43.

Figure 5:
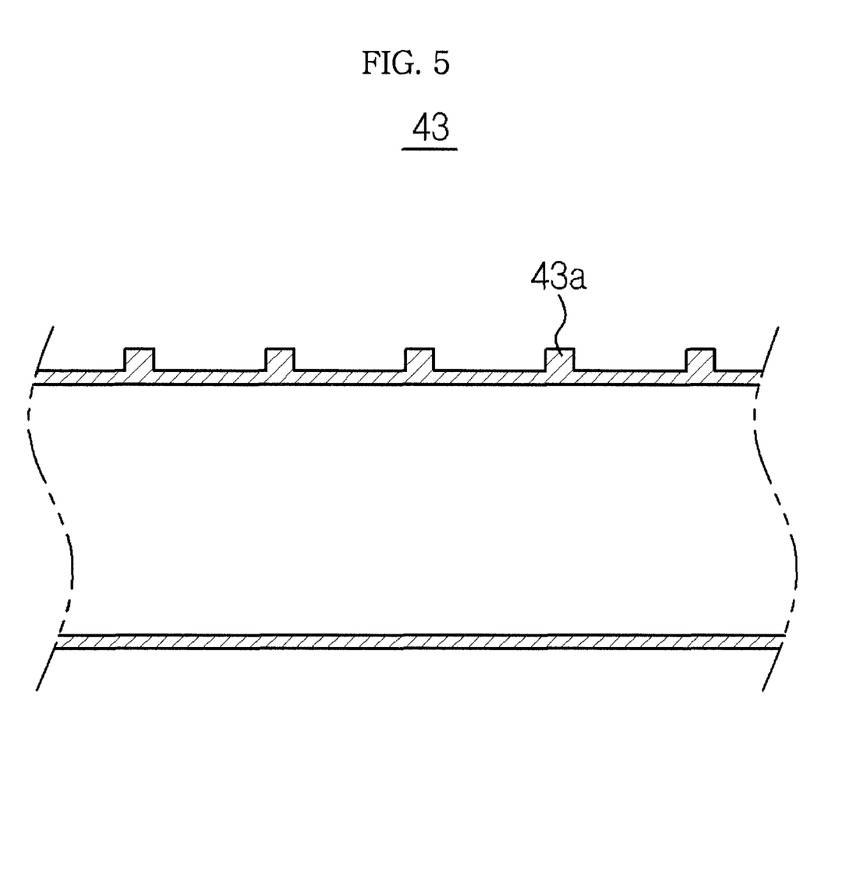
FIG. 5 is a sectional view showing a second conveyor formed with convex portions in the aging apparatus according to the embodiment of the present disclosure.

The second conveyor 43 disposed next to the first conveyor 41 immersed in the water W is slanted upwards out of the water W so as to convey the products P from the water W in the tub 30 to the outside of the tub 30. Because the second conveyor 43 is slanted upwards from an end of the first conveyor 41, the products P conveyed onto the second conveyor 43 may slip down a slope of the second conveyor 43. As shown in FIG. 2 and FIG. 5, the second conveyor 43 is formed with convex portions 43a on the slope so as to prevent the products P from slipping while being conveyed on the slanted second conveyor 43.

The third conveyor 45 is disposed next to the second conveyor 43 to convey the products P to the outside. The third conveyor 45 is mounted with air spraying devices 45a to spray air to the products P on the third conveyor 45, thereby enhancing efficiency of drying and cooling the products P. After first being cooled by the water W in the tub 30, the products P on the third conveyor 45 are dried and secondarily cooled at the same time by air from the air spraying devices 45a. Accordingly, the products P may be used immediately after being conveyed to the outside by the third conveyor 45.

The air spraying devices 45a are mounted above and below the third conveyor 45 and on left and right sides of the third conveyor 45 to surround the same, so as to repeatedly spray air to top, bottom, left and right portions of the products P on the third conveyor 45.

Hereinafter, an aging method to cool products molded using the injection molding device will be described in detail with reference to FIG. 1 through FIG. 3.

The products P molded using the injection molding device 10 are removed from the injection molding device 10 and fall therefrom at the same time. The products P removed from the injection molding device 10 fall through the guide pipe 20 in such a manner that bottoms of the products P are directed downwards. The products P falling through the guide pipe 20 are introduced into the tub 30 mounted below the guide pipe 20.

The products P introduced into the tub 30 are forcibly cooled by the water W contained in the tub 30. The tub 30 contains such an amount of water that only lower portions of the products P are immersed in the water W so as to facilitate conveyance of the products P as well as to cool the lower portions or hot spots of the products P. Also, shock occurring when the products P fall into the tub 30 through the guide pipe 20 is absorbed by the water W in the tub 30.

In order to maximize cooling efficiency when the products P are cooled by the water W in the tub 30, a temperature and a level of the water W are controlled by the temperature sensor 51 and the water level sensor 52 mounted in the tub 30.

After being cooled by the water W in the tub 30, the products P are conveyed to the outside by the conveying device 40. Because the products P may not be smoothly conveyed by the first conveyor 41 mounted in the tub 30 due to flow resistance of the water W, the water injection device 31 mounted in the tub 30 injects water to the products P, thereby smoothly conveying the products P from the first conveyor 41 to the second conveyor 43.

The products P moving onto the second conveyor 43, which is slantedly mounted next to the first conveyor 41, are conveyed out of the water W by the second conveyor 43. In order to prevent the products P from slipping while being conveyed on the slanted second conveyor 43, the second conveyor 43 may have convex portions 43a formed on the slope.

While the products P are being conveyed on the third conveyor 45, the air spraying devices 45a, which are mounted above and below the third conveyor 45 and on left and right sides of the third conveyor 45, spray air to the products P. Since the products P are dried and cooled again at the same time by air from the air spraying devices 45a while being conveyed along the third conveyor 45, the products P may be used immediately after being conveyed to the outside by the third conveyor 45.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An aging apparatus comprising:
an injection molding device configured to produce molded products and allow the molded products to be removed and fall therefrom;
a vertically disposed guide pipe to guide the molded products falling from the injection molding device therethrough in such a manner that bottoms of the molded products are directed downwards;
a tub mounted below the guide pipe, the tub containing water to cool the molded products falling into the tub through the guide pipe and absorb shock applied to the molded products, the tub including a water injection device; and
a horizontally disposed conveying device to convey the molded products cooled by the water in the tub to the outside, the conveying device being configured to receive a bottom of the molded products thereon,
wherein the guide pipe is vertically disposed between the injection molding device and the tub and the guide pipe comprises
a funnel-shaped guide part configured to receive the molded products falling from the injection molding device, and
a body part formed below guide part, the body part having a shape corresponding to a shape of the molded products, and the body part including an injection hole configured to receive water injected from the water injection device against a vertical portion of the molded products to convey the molded products out of the guide pipe along with the conveying device.

2. The aging apparatus according to claim 1, wherein the molded products fall from the injection molding device when being removed from the injection molding device.

3. The aging apparatus according to claim 1, wherein the amount of water in the tub is set such that lower portions of the molded products are immersed in the water so as to facilitate conveyance of the molded products in the tub as well as to forcibly cool the lower portions of the molded products.

4. The aging apparatus according to claim 3, wherein the tub includes a temperature sensor and a water level sensor thereinside, the temperature sensor being configured to measure a temperature of the water in the tub and the water level sensor being configured to measure a level of the water in the tub.

5. The aging apparatus according to claim 1, wherein the conveying device includes a first conveyor mounted in the tub, a second conveyor slantedly mounted next to the first conveyor, and a third conveyor mounted next to the second conveyor to convey the molded products to the outside.

6. The aging apparatus according to claim 5 wherein the molded products falling onto the first conveyor in the tub are conveyed from the first conveyor to the second conveyor by the water injection device.

7. The aging apparatus according to claim 6, wherein the second conveyor is formed with convex portions on a slope so as to prevent the molded products from slipping while being conveyed by the second conveyor.

8. The aging apparatus according to claim 5, wherein the third conveyor is mounted with air spraying devices so as to facilitate drying and cooling of the molded products on the third conveyor.

9. The aging apparatus according to claim 8, wherein the air spraying devices are mounted above and below the third conveyor and on left and right sides of the third conveyor so as to spray air to top, bottom, left and right portions of the molded products on the third conveyor.

* * * * *

UNITED STATES PATENT AND TRADEMARK OFFICE
CERTIFICATE OF CORRECTION

| | | |
|---|---|---|
| PATENT NO. | : 9,067,343 B2 | Page 1 of 1 |
| APPLICATION NO. | : 13/355126 | |
| DATED | : June 30, 2015 | |
| INVENTOR(S) | : Gyeong Su Kim et al. | |

It is certified that error appears in the above-identified patent and that said Letters Patent is hereby corrected as shown below:

In the claims

Claim 6, Column 6, Line 64

Delete "claim 5" and insert --claim 5,--, therefor.

Signed and Sealed this
Twenty-seventh Day of October, 2015

Michelle K. Lee
*Director of the United States Patent and Trademark Office*